Feb. 8, 1949.  H. E. KLEINTOP  2,461,285
MOTION-PICTURE TITLER
Filed June 6, 1945  3 Sheets-Sheet 1

WITNESSES
Hubert Fuchs
Thomas W. Kerr, Jr.

INVENTOR:
Harold E. Kleintop,
BY Paul & Paul
ATTORNEYS.

Feb. 8, 1949.     H. E. KLEINTOP     2,461,285
MOTION-PICTURE TITLER

Filed June 6, 1945     3 Sheets-Sheet 2

INVENTOR:
Harold E. Kleintop,

Feb. 8, 1949. H. E. KLEINTOP 2,461,285
MOTION-PICTURE TITLER
Filed June 6, 1945 3 Sheets-Sheet 3

WITNESSES
Hubert Fuchs
Thomas W. Kerr, Jr.

INVENTOR:
Harold E. Kleintop,
BY Paul & Paul
ATTORNEYS.

Patented Feb. 8, 1949

2,461,285

UNITED STATES PATENT OFFICE 2,461,285

MOTION-PICTURE TITLER

Harold E. Kleintop, Parkesburg, Pa.

Application June 6, 1945, Serial No. 597,913

5 Claims. (Cl. 88—16)

This invention relates to apparatus generally known as "titlers" such as employed in photographing legends or explanatory matter on motion picture films, and is concerned more particularly with titlers intended for use by amateur photographers.

Titlers of the kind referred to and commercially available heretofore consisted merely of a base with means for definitely locating a motion picture camera thereon, an apertured easel in advance of the camera having a slot at the back for receiving a titling sheet or scroll and a standard for supporting a titler lens in front of the camera lens. In the use of a titler of this sort, the sheet or scroll was threaded upward through the slot of the easel and a transparent guide with a frame rectangle inscribed or printed thereon placed in front of said easel, whereupon said scroll was shifted laterally as necessary to properly center the titular matter within the rectangle on the guide. Then, during the titling, after removal of the guide, the titling sheet was drawn upwardly manually through the slot of the easel at a suggested rate until all the titular matter had passed beyond the aperture in said easel. In thus drawing the sheet, difficulty was invariably had not only in moving the sheet at an even rate, but in keeping the titular matter properly centered, with the result that it was irregularly photographed askew on the film or run off beyond one or the other side edge of the latter. Another drawback in the use of pre-existent titlers, was the impossibility of securing uniform illumination of the titling sheet during the titling since the operator was obliged to hold a light bulb in one hand over the camera while manipulating the sheet with the other.

My invention is directed in the main toward overcoming the above mentioned drawbacks, which objective is realized in practice as hereinafter more fully disclosed, through provision in connection with a titler of the character briefly outlined, of means whereby a legend bearing scroll web is supported in such manner that it can be adjusted to accurately center the titular matter relative to the exposure aperture in the easel as well as to determine movement thereof in an absolutely straight line during the titling; means for causing uniform advance of the scroll at such a rate that the legends may be easily read during subsequent exhibition of the photographic film; fixed illuminating means insuring uniform light projection on the scroll during the titling; and means convenient of access to the operator for controlling the driving and illuminating means.

Other objects and attendant advantages will appear from the following description of the attached drawings, wherein Fig 1. is a view in side elevation of a photographic titler conveniently embodying the present improvements.

Fig. 3 is a cross section taken as indicated by the angled arrows III—III in Fig. 1.

Fig. 4 is a horizontal section taken as indicated by the angled arrows IV—IV in Fig. 1.

Figure 1:
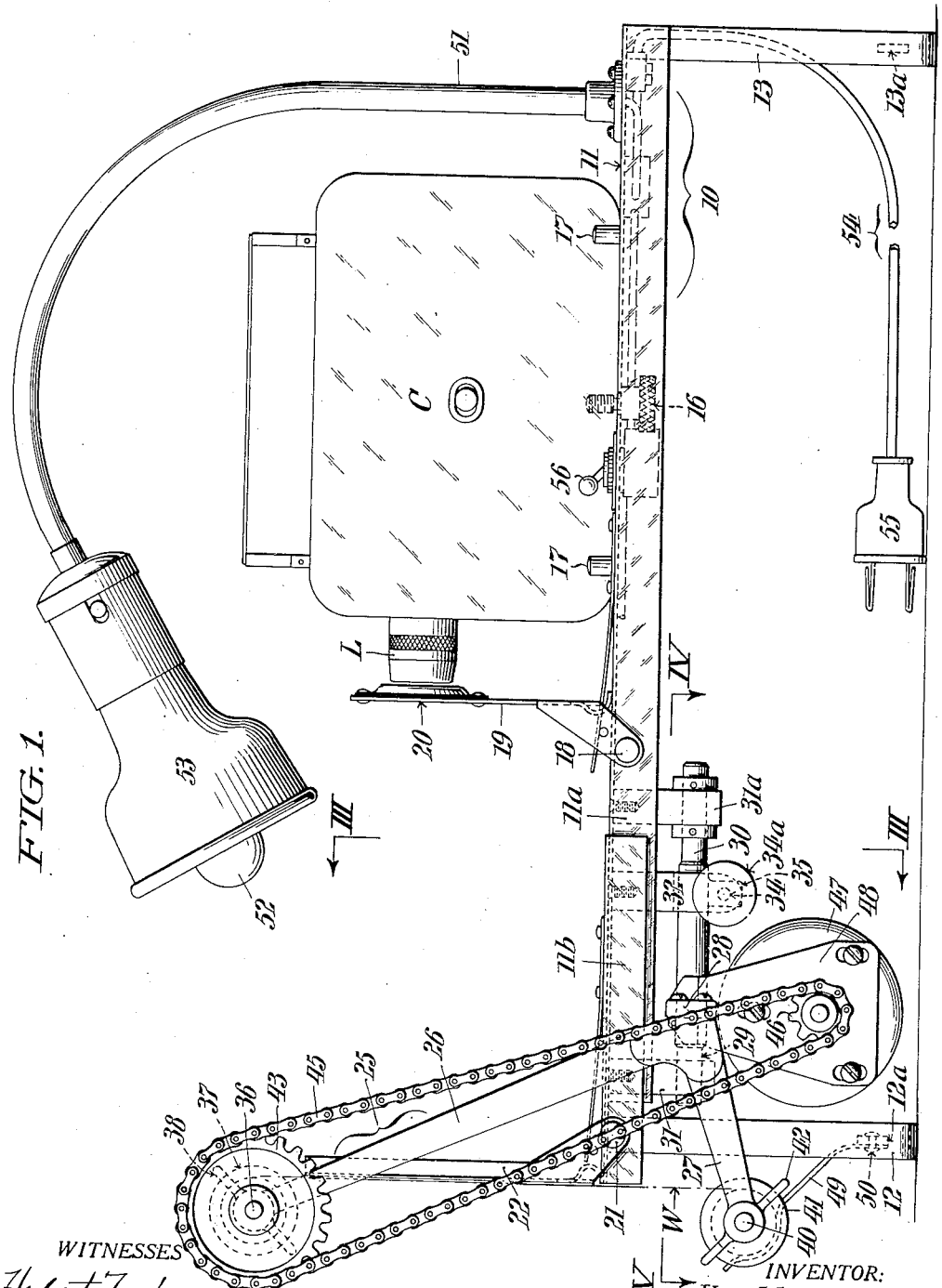
Figure 2:
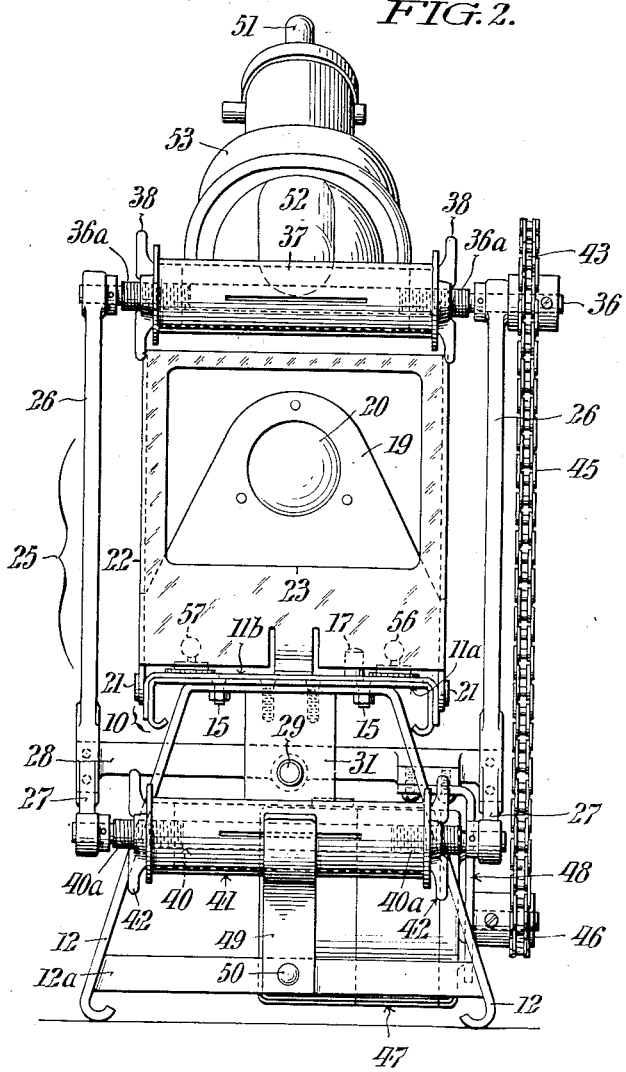
Fig. 2 is an end elevation of the titler as viewed from the left of Fig. 1.

As herein illustrated the titler includes a small table-like base 10 with a horizontally elongate top 11 which, in the present instance, is made in two section 11a and 11b respectively fashioned from stiff sheet material with longitudinally-extending side flanges, the section 11b overlapping the section 11a and the two being permanently united by riveting or otherwise. The legs 12 and 13 of the base are formed in pairs of relatively stout stiff strip material with connecting reinforcing tie bars 12a, 13a, and are secured to the top 11 by screw bolts as instanced at 15 in Fig. 2. The base 10 serves as a support for a motion picture camera represented at C, and its top 11 is provided adjacent the rear end thereof with a suitably allocated aperture for upward passage of the shank of a thumb screw 16 arranged to engage into the usual tripod screw hole in the camera bottom to firmly hold the camera in place. The proper position for the camera is otherwise determined by upstanding stop studs 17 on the base top 11 against which the camera is laterally abutted. Pivotally connected at 18 to the side flanges of the section 11a at an intermediate point of the base top 11 is a standard 19 for the titling lens 20; and similarly connected at 21 to the section 11b at the front end of said top is an easel 22 with a frame aperture 23 in axial alignment with the camera lens L.

For the purpose of movability supporting a titling scroll web W of paper or the like for vertical movement across the frame aperture 23 in the easel 22, I have provided a bracket 25 with arms 26 and 27 reaching upwardly and forwardly respectively from the opposite ends of a cross bar 28 which extends transversely beneath the base top 11 adjacent the front end of the latter. As shown, the cross bar 28 of the bracket 25 has integrally-formed axially-aligned elongate trunnions 29 and 30 which respectively project forwardly and rearwardly therefrom at the center, said trunnions being journaled in medially-disposed bearings 31 and 31a pendent from the base top 11 along its longitudinal center. Also pendent from the base top 11 is a bifurcated projection 32 which straddles the trunion 30. Threaded into the bifurcate extremities of the projection 32 from opposite sides are set screws 33 and 34 whereof the inner ends are rounded to bear with single point contact against the opposite sides of a pendent radial projection 35 on the trunnion 30, said screws having knurled manipulating heads 33a and 34a. Rotative in bearings at the upper ends of the upright arms 26 of the bracket 25 is a transverse shaft 36 whereon is freely mounted a flanged take-up spool 37 for the scroll web W, said shaft having threaded portions 36a adjacent its opposite ends engaged by wing nuts 38 through which the spool can be adjusted endwise and clamped in adjusted positions to said shaft. A similar transverse shaft 40 is journaled in bearings at the ends of the forwardly projecting arms 27 of the bracket 25, and on it is freely mounted a supply spool 41 for the scroll web W. Here also, the shaft 40 is formed with threaded portions 40a adjacent its ends for engagement by winged adjusting clamp nuts 42.

Affixed to one end of the upper spool shaft 36 is a sprocket wheel 43 which through a chain 45 is connected to a sprocket pinion 46 on the shaft of an electric motor 47 supported by a winglike projection 48 which is secured to and extends downward from the cross bar 28 of the bracket 25 adjacent one end of said bar. A spring friction brake finger 49 secured at its lower end by a rivet 50 to the tie bar 12a connecting the table legs 12, has its upper end bearing against the supply spool 41 to yieldingly restrain rotation of said spool and so keep the web W taut at all times.

Rising from the base 10 at the rear end of its top 11 is a forwardly reaching crook arm 51 which fixedly supports an electric bulb 52 with a reflector 53 above and somewhat forward of the lens standard 19 to project light upon the portion of the scroll web W exposed in the frame aperture 23 of the easel 22. Electric current for the motor 47 and lamp 52 is conducted through a cord 54 with a plug 55 which may be connected to any suitable source of current supply; and toggle switches 56 and 57 are provided on the base top 11 adjacent its rear end for separately controlling the motor 47 and the lamp 52.

From the foregoing it will be seen that through my invention it is possible to accurately position the scroll web W axially relative to the frame aperture 23 in the easel 22 by manipulating the set screws 33 and 34 to swing the bracket 25 about the axis of its trunnions 29 and 30 to the extent necessary; as well as to properly center said web laterally relative to said aperture through adjustment of the spools 37 and 41 longitudinally on their spindles by means of the winged nuts 38 and 42. These adjustments are readily effected by the operator positioned at the rear end of the apparatus with his arms extending forwardly along opposite sides thereof, the screws 33 and 34 and the nuts 38 and 42 being easily within the reach of an arm's length. In such position the control switches 56 and 57 for the motor 47 and the lamp 52 are likewise readily accessible to the left and right hand of the operator. It is to be understood that the speed reduction between the motor 47 and the take-up spool 37 is such in practice as to determine advance of the web at a moderate rate during the titling so that sufficient time is afforded for easy reading of the descriptive matter photographed on the film during subsequent exhibition projection.

Obviously, my improved titler is not limited to the photographing of running descriptive matter, since simple titles serially-arranged on the web W may be successively photographed by intermittently shifting said web as required.

Having thus described my invention, I claim:

1. A motion picture titler including in combination, a horizontal base for stationarily supporting a motion picture camera; a transversely arranged easel on the base having a frame aperture in axial alignment with the lens of the camera; a vertical bracket for rotatably sustaining at its top and bottom respectively, supply and take up spools for passage of a legend bearing scroll across the frame aperture of the easel, said braket having a bar extending transversely thereof at the bottom and a horizontal axis pivot trunnion centrally of said bar at right angles to the spool axes; a bearing in which the trunnion is rotatively supported from the base; and regulatable set screws also supported from the base and engaging a radial projection on the trunnion aforesaid from opposite sides for adjusting the bracket about the trunnion axis to align the scroll vertically with the frame aperture of the easel.

2. A motion picture titler including in combination, a horizontal base for stationarily supporting a motion picture camera; a transversely arranged easel on the base having a frame aperture in axial alignment with the lens of the camera; a vertical bracket for rotatably sustaining at its top and bottom respectively, supply and take up spools for passage of a legend bearing scroll across the frame aperture of the easel, said bracket having a bar extending transversely thereof; a horizontal axis pivot centrally of said bar at right angles to the spool axes; a bearing in which the pivot is rotatively supported from the base; and means for adjusting the bracket about the pivot to align the scroll vertically with the frame aperture of the easel.

3. The invention according to claim 2, wherein the spools for the scroll web are freely mounted on shafts rotative in bearing arms of the bracket; and wherein winged nuts in engagement with threaded portions adjacent the ends of the respective shafts bear against the corresponding ends of the spools to clamp them, with capacity for independent endwise adjustment, to said shafts.

4. The invention according to claim 2, further including means carried by the adjustable bracket for driving the take-up spool for the scroll web.

5. The invention according to claim 2, further including an electric motor carried by the adjustable bracket; and a gearing connection between the shaft of said motor and the take-up spool for the scroll web.

HAROLD E. KLEINTOP.

REFERENCES CITED

The following references are of record in the file of this patent:

UNITED STATES PATENTS

| Number | Name | Date |
|---|---|---|
| 870,751 | Welsh | Nov. 12, 1907 |
| 1,292,149 | Teague | Jan. 21, 1919 |
| 1,424,457 | Fegraeus | Aug. 1, 1922 |
| 1,761,464 | Caps | June 3, 1930 |
| 1,814,390 | Johnson | July 14, 1931 |
| 1,933,817 | Miller et al. | Nov. 7, 1933 |
| 2,303,181 | Thomas | Nov. 24, 1942 |